Patented Apr. 25, 1944

UNITED STATES PATENT OFFICE 2,347,220

PREPARATION OF GLUTAMIC ACID

Paul R. Shildneck, Decatur, Ill., assignor A. E. Staley Manufacturing Company, Decatur, Ill., a corporation of Delaware No Drawing. Application August 4, 1940,
Serial No. 351,444

9 Claims. (Cl. 260—529)

The present invention relates to an improved process for the production of glutamic acid and has for a principal object the improvement of processes of the type described in Corti Patent No. 1,255,390.

An additional object of the invention is the preparation of a relatively pure glutamic acid by a process which involves the hydrolysis of a protein material such as corn gluten by concentrated hydrochloric acid, followed by neutralization with an amount of an alkali in excess of that required to react with the free hydrochloric acid and that combined with amino acids, filtration and concentration of the neutralized liquor, removal of other amino acids from the concentrated liquor, addition of an amount of acid equivalent to the amount of alkali which was initially added to produce the excess neutralization, and recovery of glutamic acid from the liquor by crystallization.

Still another object of the invention is the production of glutamic acid by hydrolyzing a protein substance with hydrochloric acid at a low pH of the order of one or less, neutralization beyond the point where only the free hydrochloric acid and that combined with the amino acids is affected by the use of a suitable base in an amount approximately equivalent to the total hydrolyzing acid in the mixture, separation of amino acids other than glutamic acid from the neutralized mixture, adding a sufficient quantity of acid to bring the acidity of the mixture back to said point, and separating the glutamic acid from the solution.

A further object of the invention is the production of glutamic acid by hydrolyzing a protein material with a mineral acid, neutralizing the resulting mother liquor beyond the point at which only the free hydrochloric acid and that combined with the amino acid is affected, the neutralization being produced by the use of ammonium hydroxide, filtering the neutralized solution, concentrating the filtered solution, removing amino acids other than glutamic acid from the concentrated solution and at the same time removing ammonium chloride, again adding acid to bring the acidity of the solution back to the point where only the free hydrochloric acid and that combined with the amino acids is neutralized, and removal of the glutamic acid from the resulting solution.

In the Corti Patent No. 1,255,390, to which reference has been made, there is described a process for the production of glutamic acid and the separation of this glutamic acid from other amino acids, the process involving the acid hydrolysis of a suitable albumen and subsequent neutralization of the hydrolysate with a suitable alkali so that only the free hydrochloric acid and that combined with the amino acids is affected. The solution then is allowed to crystallize to produce a maximum yield of glutamic acid. It also effects a separation of the glutamic acid from the other amino acids present in the solution.

In the case of many albumens such as corn gluten the acid hydrolysis results in the production of rather large quantities of other amino acids such as tyrosine and leucine, and when present in such relatively large quantities these other amino acids have a tendency to precipitate with the glutamic acid so that the latter may be in a less high percentage than is desired.

In accordance with the present process a suitable protein material such as corn gluten is subjected to an initial acid hydrolysis with hydrochloric acid, the acidity of the reaction mixture being rather high. As an example of a suitable method of conducting this acid hydrolysis, 192 pounds of corn gluten containing 68.3 per cent protein is boiled under atmospheric reflux for 18 hours with 244 pounds of 28 per cent hydrochloric acid and 45 pounds of water. The resulting hydrolyzate is dark colored and contains a considerable quantity of humin.

The recovery of the desired material is effected after partial neutralization of the solution and by bringing the acidity of the material to a point at which only the free hydrochloric acid and the hydrochloric acid combined with the various amino acids is neutralized. However, I have found that considerably improved results may be obtained by first adding an amount of alkali to the hydrolyzate substantially in excess of the amount to bring the solution to the desired point for recovery of glutamic acid, removing solids other than glutamic acid from the solution, and then returning the solution to the desired acidity for removal of glutamic acid. The particular amount of alkali may vary somewhat, but in the preferred embodiment of the process the amount of alkali added to the hydrolyzate is substantially equivalent to the total amount of hydrolyzing acid. In the case of the specific example given the hot hydrolyzed mixture is diluted with 195 pounds of cold water and to the diluted solution is added about 115 pounds of 28 per cent ammonia water.

Subsequent to the addition of the ammonia water the neutralized mixture is filtered to remove humin. Suitable washing operations may be employed for recovering residual liquor from the humin filter cake. About 123 pounds of wet humin cake may be separated in this operation, this cake containing around 36 pounds of dry substance.

The filtered liquid then is subjected to a concentrating operation in an evaporator in which the liquor is concentrated to the point of incipient crystallization of ammonium chloride when the solution is cooled to a temperature of about 25° C. This concentration will correspond to a slurry density of about 18 to 19° Baumé at 40° C. It will be understood that a substantial amount of ammonium chloride is produced in the neutralization of the hydrochloric acid by ammonium hydroxide.

After concentration of the solution to the extent described the slurry is cooled to about 25° C. and seeded with a dry powdered mixture of tyrosine and leucine, the seeded mixture then being stirred gently for about 20 hours.

This operation reduces the degree of tyrosine supersaturation in the filtered liquor immediately prior to glutamic acid crystallization to a substantially greater extent than that produced if the steps comprising initial evaporation, filtration, further evaporation, filtration, and crystallization of glutamic acid are executed without appreciable intervals of time between them. Reduction of tyrosine supersaturation in the final liquor has the very beneficial effect of reducing the proportion of tyrosine coprecipitating with the glutamic acid, which, in turn, improves the filtration of glutamic acid from its mother liquor and reduces the proportion of activated carbon required to decolorize the crude glutamic acid.

Omission of the tyrosine-leucine crystallization step results in the crude glutamic acid being contaminated with 2 to 5 per cent of tyrosine, whereas incorporation of this step in the process as described reduces the tyrosine contamination to an upper value of 0.4 to 0.5 per cent. Only half as much activated carbon is required to decolorize the glutamic acid carrying the lower tyrosine content as that carrying the higher.

Reduction of tyrosine supersaturation in the hydrolyzate so as to improve the quality and filterability of the glutamic acid may be accomplished by procedures other than the one specified. Tyrosine may be crystallized from the neutralized light liquor prior to the initial evaporation, and it may be crystallized from the filtrate obtained by filtration of the slurry from the initial evaporation, but I have found the specified procedure to be the most efficient one. Tyrosine crystallization should not be delayed until after the further concentration of liquor because immediate filtration of the slurry from this concentration is important to successful process operation at this point.

In the specific example given the crystallized slurry is filtered, yielding about 585 pounds of filtrate having a density of about 18° Baumé at 40° C. The filter cake consisting principally of tyrosine and leucine weighs about 74 pounds when wet and contains around 37 pounds dry substance leucine and tyrosine.

It is significant that during the initial concentration and crystallization step none of the glutamic acid in the solution separates out. After removal of the tyrosine and leucine the remaining mother liquor contains all the glutamic acid formed in the initial protein hydrolysis, and both the concentration of glutamic acid (mostly as a salt form) and the ratio of glutamic acid to the remaining amino acids in the liquor are substantially increased. This is of benefit in the subsequent separation of glutamic acid because it prevents co-separation of tyrosine and leucine with the glutamic acid, and because it increases the yield of glutamic acid by decreasing the mother liquor loss.

Subsequent to the filtration of the mother liquor from the crystallized tyrosine and leucine the mother liquor is subjected to a further concentration to increase its density to about 28° Baumé at 40° C. It will be understood that suitable washing and recovery operations may be conducted after the filtration to recover residual mother liquor containing glutamic acid from the crystalline tyrosine and leucine. At the concentrated density the mother liquor in the specific examples given will have a weight of about 482 pounds.

During the second concentration the major quantity of inorganic salt in the solution will crystallize in the evaporator and thus separate from the solution. The further concentration in addition to the salting out effect of the increased concentration of ammonium chloride also results in the precipitation in the evaporator of further quantities of leucine and tyrosine, thereby ridding the mother liquor of further quantities of these interfering acids.

In the manufacture of glutamic acid by its crystallization directly from partially neutralized hydrochloric acid hydrolyzates I have found that the use of ammonia as the neutralizing agent provides a distinct advantage over sodium bases regarding filtration of the amino acid-inorganic salt slurry obtained in the final concentration step. This advantage apparently resides in the fact that the density of the ammonium chloride crystal is almost 50 per cent less than that of the sodium chloride crystal. Owing to its materially lower density, the ammonium chloride crystal almost floats in the concentrated liquor and thereby exerts a much less milling action on the relatively soft amino acid crystals in the final concentration step than does the heavier sodium chloride crystal. The lighter ammonium chloride crystal, because of its slower settling rate in the concentrated liquor, also improves the operation of factory filtration equipment by permitting a more uniform cake to be built up on the filter cloth or screen.

Efficient and quantitative separation of glutamic acid-bearing liquor from precipitated solids in the slurry obtained in the final concentration step is the operational bottleneck of the process. Other factors remaining the same, the yield of glutamic acid increases directly with the degree of liquor concentration (expressed on a glutamic acid basis) secured in the final concentration step, but the difficulty in performing the necessary filtration also increases with increased liquor concentration. Any process variation improving filtration of the slurry obtained in the final concentration will either increase the yield of glutamic acid or decrease its unit cost of recovery.

Immediately following this dual concentration and crystallization step the slurry is filtered. If the slurry stands too long after the concentration it becomes more difficult to filter.

The concentrated glutamic acid mother liquor then is treated with a sufficient quantity of 28 per cent hydrochloric acid to return the mother liquor to an acidity at which only the free hydrochloric acid and that combined with the amino acids is neutralized, whereas the amino acids liberated from the albumen by hydrolysis are not acted on by the neutralizing agent. After return of the acidity in this manner the liquor is cooled and seeded with previously formed crystals of glutamic acid. The mixture then is stirred for several days until there is no further crystallization of glutamic acid from the solution.

The mother liquor is filtered from the crystalline glutamic acid and there is recovered about 20 pounds of dry glutamic acid crystals. These crystals are of a relatively high state of purity of the order of 93 to 95 per cent glutamic acid which has a specific rotation in 5° Baumé hydrochloric acid of plus 29.5° to plus 30° at 10 per cent concentration.

The initial neutralization of the acid hydrolyzate past the point at which only the free hydrochloric acid and that combined with the amino acids is affected prevents any appreciable quantities of the glutamic acid from separating, particularly where the reaction liquid is not concentrated until after the neutralization has been completed. When the solution is finally brought back to the proper state of acidity for separation of the glutamic acid, the other interfering amino acids and substantially quantities of ammonium chloride have been removed from the solution. This provides for a glutamic acid crystallization from a mother liquor which has quite small quantities of other precipitatable substances. In the Corti process the precipitation was carried on directly at the proper point for the precipitation of glutamic acid, and at this acidity it is found that there is a tendency for other amino acids to separate along with the glutamic acid. Particularly is this true in the case of hydrolyzates produced from corn gluten and similar protein materials of such nature that relatively large percentages of other amino acids than glutamic acid are produced during the acid hydrolysis.

It will be noted in the process that the hydrolyzate is produced at a high acidity and the mother liquor is prepared for further treatment by neutralization with ammonia before concentration. As before stated, this neutralization goes beyond the point necessary for the proper separation of glutamic acid. The initial concentration of this neutralized liquor avoids the necessity of working with highly acid solutions at high temperatures.

The initial concentration is carried to the point of incipient crystallization of salt from the solution. It is preferred to stop the concentration at about this point, since otherwise there would be produced an undue amount of salt and this in turn would interfere with the filtration of the leucine and other amino acids which may be precipitated during the initial crystallization step. Thus, the leucine and tyrosine are separated in a condition relatively free from amino acids, and the glutamic acid is precipitated relatively free from other amino acids and salt.

As the concentration of the initially evaporated solution may be of the order of about 18° Baumé and the concentration of the final liquor may be of the order of 28° Baumé, the second concentrating operation effects a further and substantial precipitation of salt during the evaporation. In fact, the bulk of the salt produced in the process will be precipitated at this point. The concentration of the residual leucine and tyrosine also is materially increased and this concentration together with the salting out effect of the ammonium chloride causes the separation in the second evaporator of further quantities of amino acids other than glutamic acid.

Immediately following the second concentration step in which salt and residual quantities of leucine and tyrosine precipitate, the evaporated slurry is filtered for removal of these precipitates. If this filtration is delayed too long the precipitated amino acids become difficult to filter.

After filtration of the slurry from the second evaporators the effluent will be in a condition suitable for recovery of glutamic acid in a relatively pure condition. Practically all of the interfering amino acids will have been removed and the bulk of the salt produced in the process likewise will have been separated from the solution.

It will be seen that the process involves two different neutralization steps. In the first, the hydrolyzate is carried through and beyond the point for recovery of glutamic acid. In the second, the solution is returned to this point. The difference between these points represents the ammonia which is produced in the acid hydrolysis of the gluten protein. Thus, in returning the solution to the point at which only the free mineral acid and that combined with the amino acids is affected, the quantity of mineral acid required will be substantially equivalent to the ammonia produced in the process, and the excess alkali required in the first neutralization step likewise will be substantially equivalent to the amount of ammonia resulting from the acid hydrolsis.

The various changes which may be effected in the process as described herein without departing from the invention are intended to be included in the appended claims.

I claim:

1. In the process of producing glutamic acid which comprises the hydrolysis of a proteinaceous substance with a mineral acid and subsequent neutralization treatment of the resulting hydrolyzate to obtain said glutamic acid, the improvement which consists of the following steps: neutralizing the hydrolyzate beyond the point at which only the free mineral acid and that combined with the amino acid is affected with an amount of alkali which is substantially equivalent to the amount of ammonia resulting from the acid hydrolysis; concentrating the neutralized liquor and removing amino acids other than glutamic acid therefrom; and, adding acid to the liquor in an amount substantially equivalent to the ammonia produced in the process to bring the acidity thereof back to the point at which only the free mineral acid and that combined with the amino acids is affected, and recovering the glutamic acid.

2. In the process of producing glutamic acid which comprises the hydrolysis of a proteinaceous substance with a mineral acid and subsequent neutralization treatment of the resulting hydrolyzate to obtain said glutamic acid, the improvement which consists of the following steps: neutralizing the hydrolyzate beyond the point at which only the free mineral acid and that combined with amino acids is affected with an amount of alkali which is substantially equivalent to the amount of ammonia resulting from the acid hydrolysis; removing substances other than glutamic acid from the neutralized liquor; and, adding further quantities of an acid to the liquor in an amount substantially equivalent to the ammonia produced in the process and recovering the glutamic acid.

3. In the process of producing glutamic acid which comprises the hydrolysis of a proteinaceous substance with hydrochloric acid and subsequent neutralization treatment of the resulting hydrolyzate to obtain said glutamic acid, the improvement which consists of the following steps: neutralizing the hydrolyzate with an amount of alkali in excess of that required to react with the free hydrochloric acid and that combined with the amino acids of the hydrolyzate, said amount of alkali being substantially equivalent to the amount of ammonia resulting from the acid hydrolysis; filtering the neutralized liquor, concentrating the filtered liquid, removing an amino acid other than glutamic acid from the concentrated liquor and further concentrating the liquor; and, recovering glutamic acid from the further concentrated liquor.

4. In the process of producing glutamic acid which comprises the hydrolysis of a proteinaceous substance with a mineral acid and subsequent neutralization treatment of the resulting hydrolyzate to obtain said glutamic acid, the improvement which consists of the following steps: neutralizing the hydrolyzate substantially to the point that the total hydrolyzing acid is neutralized with an amount of alkali which is substantially equivalent to the amount of ammonia resulting from the acid hydrolysis; recovering an amino acid other than glutamic acid from the neutralized liquor; and, adding additional quantities of an acid to the liquor in an amount substantially equivalent to the ammonia produced in the process and recovering glutamic acid therefrom.

5. In the process of producing glutamic acid which comprises the hydrolysis of a proteinaceous substance with a mineral acid and subsequent neutralization treatment of the resulting hydrolyzate to obtain said glutamic acid, the improvement which consists of the following steps: adding an alkaline material in a molar quantity corresponding to the molar quantity of said mineral acid to the hydrolyzate to bring the acidity thereof to the point beyond which only the free mineral acid and that combined with the amino acids is affected, said quantity of alkaline material being in an amount which is substantially equivalent to the amount of ammonia resulting from the acid hydrolysis; removing an amino acid other than glutamic acid from the liquor; and adding an acid to the liquor in an amount substantially equivalent to the ammonia produced in the process to bring the acidity thereof substantially to a point at which only the free mineral acid and that combined with the amino acids remaining in the solution is neutralized and recovering the glutamic acid.

6. In the process of producing glutamic acid which comprises the hydrolysis of a proteinaceous substance with hydrochloric acid and a subsequent neutralization treatment with ammonia of the resulting hydrolyzate to obtain said glutamic acid, the improvement which consists of the following steps: neutralizing the hydrolyzate with ammonia in an amount substantially equivalent to the amount of hydrochloric acid and ammonia resulting from the acid hydrolysis and filtering the hydrolyzate; concentrating the filtered hydrolyzate to a point short of that at which substantial quantities of inorganic salt precipitates, removing a mixture of tyrosine and leucine from the concentrated hydrolyzate and again concentrating the hydrolyzate; and, adding a further quantity of hydrochloric acid to the hydrolyzate in an amount substantially equivalent to the ammonia produced in the process to bring the acidity thereof to the point at which only the free hydrochloric acid and that combined with amino acids in the hydrolyzate is neutralized and crystallizing glutamic acid from the liquor.

7. In the process of producing glutamic acid which comprises the hydrolysis of a proteinaceous substance with hydrochloric acid and a subsequent neutralization treatment with ammonium hydroxide of the resulting hydrolyzate to obtain said glutamic acid, the improvement which consists of the following steps: adding an amount of ammonium hydroxide to the hydrolyzate in excess of that required to neutralize only the free hydrochloric acid and that combined with the amino acids of the hydrolyzate, said ammonium hydroxide being in an amount substantially equivalent to the amount of ammonia formed during the acid hydrolysis; concentrating the hydrolyzate to an intermediate point at which a minor quantity only of the ammonium chloride of the hydrolyzate will crystallize, separating leucine and tyrosine from the hydrolyzate, subjecting the hydrolyzate to a second concentration for removal of a major quantity of ammonium chloride and small quantities of leucine and tyrosine and separating the ammonium chloride and small quantities of leucine and tyrosine from the hydrolyzate; and, adding a further quantity of hydrochloric acid to said hydrolyzate in an amount equivalent to said excess of ammonia hydroxide and ammonia produced in the process and subjecting the remaining hydrolyzate to crystallization for removal of glutamic acid.

8. In the process of producing glutamic acid which comprises the hydrolysis of a proteinaceous substance with a mineral acid and subsequent neutralization treatment of the resulting hydrolyzate to obtain said glutamic acid, the improvement which consists of the following steps: neutralizing the hydrolyzate beyond the point for maximum recovery of glutamic acid with an amount of alkali which is substantially equivalent to the amount of ammonia resulting from the acid hydrolysis, concentrating the neutralized hydrolyzate, removing an amino acid other than glutamic acid from the concentrated hydrolyzate and further concentrating the hydrolyzate; and, adding a further quantity of an acid to the hydrolyzate in an amount substantially equivalent to the amount produced in the process to bring the acidity thereof to the point of maximum recovery of glutamic acid and crystallizing glutamic acid from the hydrolyzate.

9. In the process of producing glutamic acid which comprises the hydrolysis of a proteinaceous substance with hydrochloric acid and a subsequent neutralization treatment with ammonium hydroxide of the resulting hydrolyzate to obtain said glutamic acid, the improvement which consists of the following steps: adding an amount of ammonium hydroxide to the hydrolyzate in excess of that required to bring the acidity of the hydrolyzate to the point of maximum recovery of glutamic acid, said amount of ammonium hydroxide being substantially equivalent to the amount of ammonia resulting from the acid hydrolysis; concentrating the hydrolyzate, removing an amino acid other than glutamic acid from the concentrated hydrolyzate and subjecting the hydrolyzate to a further concentration to precipitate a major proportion of the ammonium chloride in said hydrolyzate; and, adding a further quantity of hydrochloric acid to the hydrolyzate in an amount substantially equivalent to the ammonia produced in the process to bring its acidity to the point for maximum recovery of glutamic acid and crystallizing glutamic acid from the hydrolyzate.

PAUL R. SHILDNECK.